(No Model.) 6 Sheets—Sheet 2.

O. R. CHAPLIN.
SHOE NAILING MACHINE.

No. 391,020. Patented Oct. 16, 1888.

Witnesses:
Walter E. Lombard.
Alex G. Donnelly,

Inventor:
Orril R. Chaplin,
by N. C. Lombard,
Attorney.

(No Model.) 6 Sheets—Sheet 3.

O. R. CHAPLIN.
SHOE NAILING MACHINE.

No. 391,020. Patented Oct. 16, 1888.

Witnesses:
Walter G. Lombard.
Alex G. Donnelly.

Inventor:
Orril R. Chaplin,
by N. C. Lombard,
Attorney.

(No Model.) 6 Sheets—Sheet 5.

O. R. CHAPLIN.
SHOE NAILING MACHINE.

No. 391,020. Patented Oct. 16, 1888.

Witnesses:
Walter E. Lombard
Alex G. Donnelly

Inventor:
Orril R. Chaplin,
by N. C. Lombard,
Attorney.

(No Model.)  6 Sheets—Sheet 6.

O. R. CHAPLIN.
SHOE NAILING MACHINE.

No. 391,020.  Patented Oct. 16, 1888.

Witnesses:
Walter O. Lombard
Alex G. Donnelly

Inventor:
Orril R. Chaplin,
by N. C. Lombard,
Attorney.

UNITED STATES PATENT OFFICE.

ORRIL R. CHAPLIN, OF BOSTON, MASSACHUSETTS.

SHOE-NAILING MACHINE.

SPECIFICATION forming part of Letters Patent No. 391,020, dated October 16, 1888.

Application filed January 9, 1888. Serial No. 260,196. (No model.)

*To all whom it may concern:*

Be it known that I, ORRIL R. CHAPLIN, of Boston, in the county of Suffolk and State of Massachusetts, have invented certain new and useful Improvements in Shoe-Nailing Machines, of which the following, taken in connection with the accompanying drawings, is a specification.

My invention relates to that class of nailing-machines which cut the nails from a wire and drive them into the sole of the boot or shoe for securing the said sole to the upper, and is an improvement upon the invention described in the Letters Patent No. 343,363, granted to me June 8, 1886; and it consists in certain novel features of construction, arrangement, and combination of parts, which will be readily understood by reference to the description of the drawings and to the claims to be hereinafter given, and in which my invention will be particularly pointed out.

Fig. 3 is a front elevation of the same portion of the machine as shown in Fig. 1.

In the drawings, A is the base of the machine provided with the legs A'.

$A^2$ is the column.

$A^3$ is the frame of the head of the machine.

B is the driving-shaft.

B' and $B^2$ are the tight and loose pulleys; $B^3$, the hand and fly wheel; C, the clutch-operating treadle.

D is the wire-carrying reel or drum.

E is the driver-stock having set in its lower end the steel driver $a$; E' and $E^2$, the toggle-links for operating the same.

$E^3$ is the connecting-rod; $E^4$, the cam-operated slide.

$B^4$ is the cylinder-cam for imparting motion to the several parts.

F is the feed-shaft.

$b$ and $b'$ are the wire-feeding rolls, to which an intermittent rotary motion is imparted through the medium of the ratchet-wheel $c$, lever $c'$, stop-arm $c^2$, pawls $c^3$ and $c^4$, rod G, levers G' and $G^2$, and cam $B^6$.

H is the die-holding block, H' and $H^2$ the cutting-dies.

I is the cutting-plunger, to which a reciprocating motion is imparted by the cam $B^4$ acting upon the lever I'.

$I^2$ is the nose, and J is the sole-edge gage.

L is the shoe-supporting horn mounted upon the upper end of the supporting-rod L' so as to be freely revoluble thereon, said rod being mounted in bearings on the pivoted bar or frame M; and N is the clamping-shoe for holding the horn in its elevated position when the nail is driven.

L² is the bifurcated collar clamped to the lower end of the rod L' so as to move vertically with said rod, it being guided in its upward movement by the sides of a slot formed in the lower end of the pivoted bar or frame M, and provided with the journal or pin $d$, upon which is mounted by its lower end the arm N', in the upper end of which is formed the slot $e$, with which the three-sided crank-pin $e'$ on the shaft O engages and upon which it acts to vibrate said arm. The shaft O has a rotary motion imparted thereto from the main shaft B through the medium of the worm O', the worm-wheel O², the shaft O³, and the bevel gear-wheels O⁴ and O⁵. The lower end of the horn supporting rod L' is connected by the link L³ to the treadle-lever L⁴, by which said horn may be depressed against the tension of the spring L when the pressure of the clamping-shoe N is removed therefrom.

The devices thus far described, except in particulars to be hereinafter referred to, are constructed, arranged, and operate substantially in the same manner as described in my prior patent hereinbefore referred to.

I will now proceed to describe the improvements which constitute my present invention and for which I solicit Letters-Patent.

In the operation of the machine described in my said prior patent the metal chips cut from the side of the wire to give form to the nail were a source of trouble, from the fact that occasionally a chip, instead of falling through the hole in the die-block directly beneath where it was severed from the wire, would be caught by the male cutting-plunger while making a subsequent forward movement, and be carried forward with the new nail and be driven with the nail into the shoe, and sometimes in such a way as to disfigure the shoe or injure its appearance. To obviate this difficulty and render it impossible for the chips to get in front of the male cutting-die $f$, a short plunger, I³, is placed directly in front of the cutting-plunger I in a suitable bearing in the die-holder H, a portion of the length of said short plunger having the same outline in cross-section as the male cutting-die $f$, and said plunger I³ being connected to the lower end of the lever $g$, having its fulcrum at $g'$ and having mounted in a stud set therein an anti-friction roll, $g²$, as shown.

The plunger I³ is arranged to be moved outward or toward the front of the machine by the forward movement of the male cutting-die $f$, with the newly-cut nail clamped between said die and plunger, and in the opposite direction by the tension of the spring $g³$ when the driver-stock has moved upward sufficiently far to remove the plate $g⁴$ from the path of the roll $g²$, at which time the driver $a$ will have been removed from the path of the plunger I³, said plate $g⁴$ being secured to and moving up and down with the driver-stock. As the driver and male cutting-die plunger were both operated by the same cam-path in my prior patent, before cited, in order to apply my supplementary guard-plunger I³ and make it effective it became necessary that the driver should be raised after driving a nail much quicker than in said prior invention. To accomplish this without the expense of making an independent cam, I form in the cam B⁴, in addition to original or regular path, $h$, the switch-path $h'$, to act upon the truck $b²$ on the driver-operating slide E⁴, to raise the driver suddenly, said truck being compelled to follow said switch-path by the tension of the spring $b³$, secured to the side of the frame A³ in position to be struck at its free end by the rear end of the slide E⁴ when it is moved to the rear in driving the nail, said spring being limited in its forward movement by the stop-pin $b⁴$, set in the side of the frame A³, as shown in Fig. 1.

Figure 5:
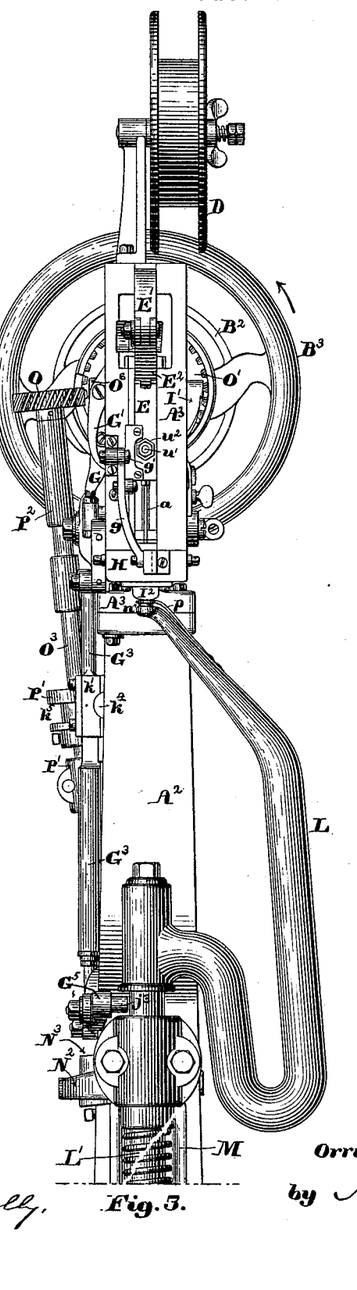
Fig. 5 is a sectional side elevation of the head of the machine, looking at the side opposite to Fig. 1.

In the machine described in my before-cited prior patent only one set of cutting-dies were used; but I found it desirable to use an additional set of dies for pointing the nail prior to the severing of said nail from the wire and slabbing the main body of the shank of the nail, so that all nails cut should have the same thickness of point regardless of their length; and to this end I use the sliding plate $h²$, carrying the removable half-dies $h³$ $h³$, and provided with the transverse groove $h⁴$ upon its upper side, with which the rib or lug $i$, on the short rocker-shaft $i'$, engages, as shown in Fig. 5.

Figure 1:
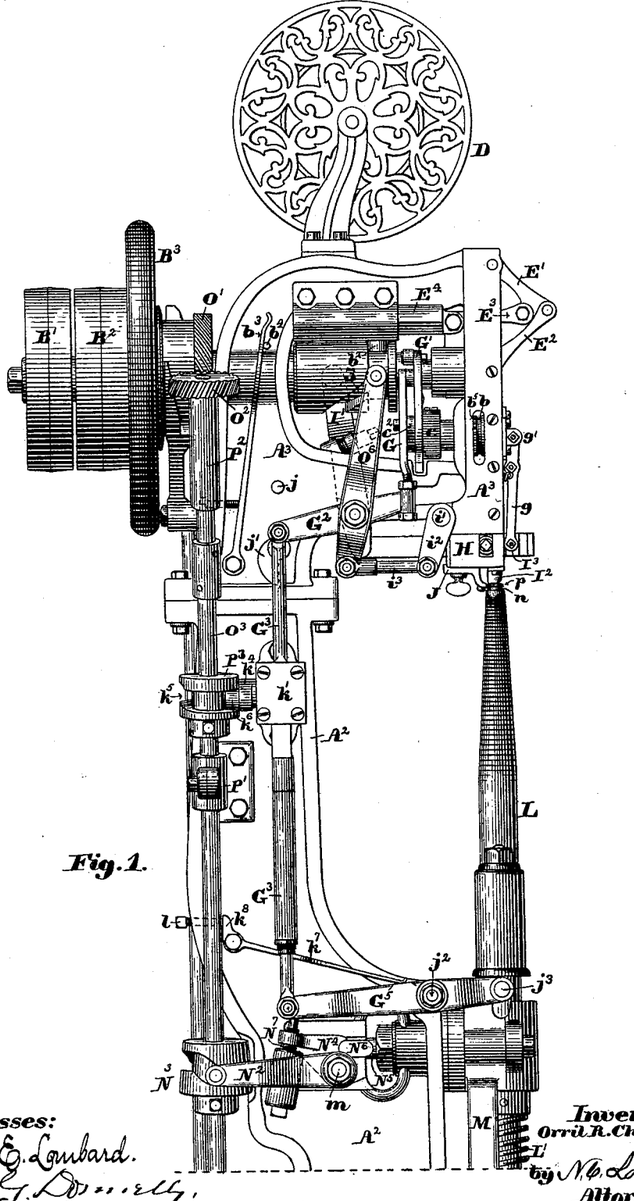
Figure 1 of the drawings is a side elevation of the upper portion of a machine, illustrating my invention.
Figures 2, 27, 28:
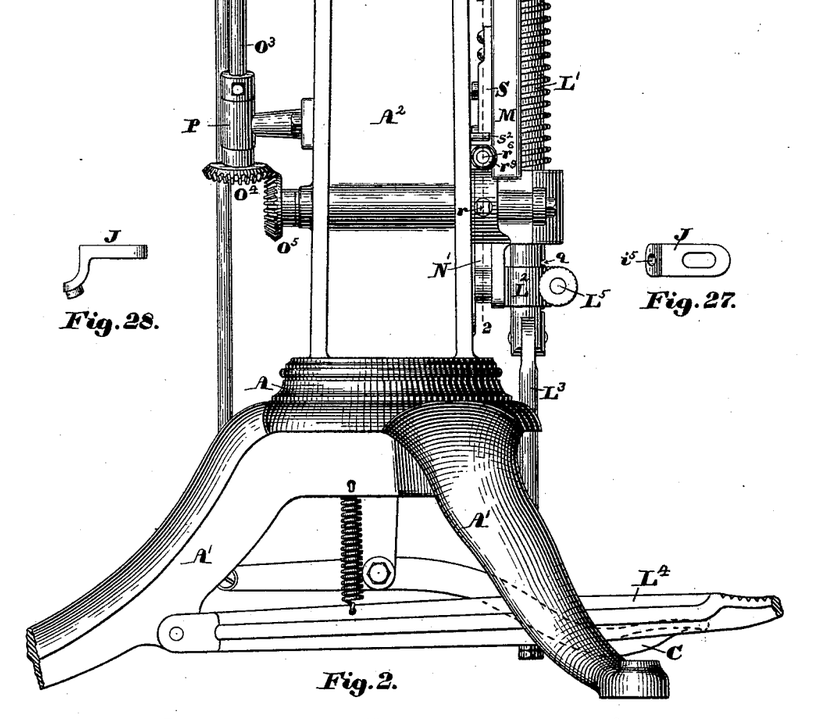
Fig. 2 is a similar side elevation of the lower portion of the machine, with a portion of one of the legs broken away.
Figs. 27 and 28 are respectively a plan and a side elevation of the sole-edge gage.

The shaft $i'$ has secured upon one end thereof the arm $i²$, the movable end of which is connected by the rod $i³$ to the lower end of the lever O⁶, mounted loosely upon the fulcrum-pin O⁷, and provided at its upper end with an anti-friction roll to fit into and be acted upon by the path $h$ of the cam B⁴, as shown in Figs. 1 and 5. The two half-dies have their inner faces inclined and are provided with notches $h⁵$, extending transversely across said inner faces, one side of each of said notches being cut at right angles to said inner face to form a cutting-corner, said notches forming, when the half-dies are placed in position in the plate or frame $h²$, a vertical opening, through which the wire to be cut is fed, the right-angled corners of the inclined inner faces of the half-dies constituting together a movable female cutting-die for pointing the end of the wire.

Figures 17, 18, 19, 20, 21, 22, 23, 24, 25:
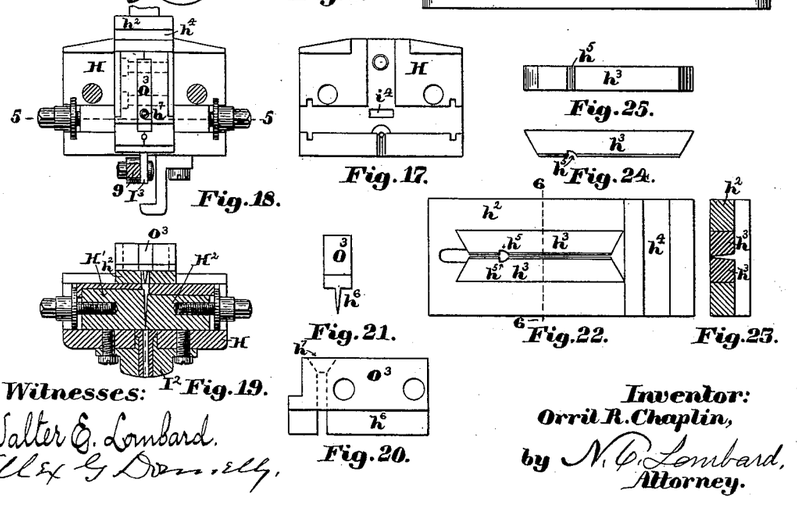
Fig. 17 is a plan of the die-block.
Fig. 18 is a plan of the same block with cutting-dies and plunger thereon.
Fig. 19 is a vertical section on line 5 5 on Fig. 18.
Figs. 20 and 21 are respectively a side elevation and a front end elevation of the stationary pointing-cutter.
Figs. 22 and 23 are respectively a plan and a transverse section of the point-cutting dies and slide, the cutting-plane of said section being on line 6 6 on Fig. 22.
Figs. 24 and 25 are respectively a plan and an elevation of the inner face of one of the movable point-cutting dies.

The male die to co-operate therewith for pointing said wire consists of the wedge-shaped rib $h⁶$, which projects downward from the block O⁸, and fitting into and filling transversely the wedge-shaped space between the half-dies $h³$ $h³$, (seen in Fig. 23,) said block O⁸ being secured in a fixed position and being provided with the vertical opening $h⁷$, through which the wire from which the nails are to be cut is fed preparatory to being acted upon by the cutting-dies.

It will be seen that the levers I' and O⁶ for operating the male cutting-die plunger I and the pointing-die carrying-plate $h²$, respectively, are both operated by the path $h$ of the cam $B^4$; but as said levers are arranged upon opposite sides of said cam, and as the die $f$ cuts the nail when moving toward the front of the machine, and the pointing-dies perform the work of pointing the end of the wire during the movement of the plate $h^2$ toward the rear of the machine, and the further fact that the throw 2 of said cam which moves the lever $I'$ in the proper direction to sever the nail from the wire and complete the shaping of its shank commences to act upon said lever a little in advance of the action of the throw 3 upon the lever $O^6$, it follows that in the operation of the cutting-dies the die $f$ first completes shaping the sides of a nail and severs it from the wire by its forward motion, and as soon as said nail is severed and before it reaches a position beneath the driver the die-carrying plate $h^2$ is moved toward the rear to point the end of the wire preparatory to the action of the die $f$ thereon for forming another nail at its next forward movement. When the plate $h^2$ is again moved toward the front of the machine by the throw 2 of the cam-path $h$, so as to bring the opening formed by the notches $h^5$ in the half-dies in line with the opening $h^7$ in the block $O^3$, and the die $f$ has been moved to the rear until its front end reaches the rear of said opening, and the guard-plunger $I^3$ has been moved toward the rear until its rear end reaches the front side of said opening, the chips which were cut from the side of the nail previously severed by the die $f$, as well as the chips severed from the end of the wire by the pointing-dies, will drop through the hole $i^4$ in the die-block H, and through the opening $i^5$ in the sole-edge gage J, from which they may be conveyed to any suitable receptacle by a tube connected to said gage, but not shown in the drawings.

In the machine described in my before-cited prior patent the length of wire to be fed, and consequently the length of nail to be cut, was controlled by the adjustment of two scroll stop-cams, and the placing of the operator's foot upon a treadle to determine whether a long nail or a short nail should be cut.

In my present invention I dispense entirely with one of the scroll stop-cams and use instead thereof a plain stop-pin, $j$, the other scroll stop-cam, $j'$, being used in substantially the same manner as in said prior patent.

I also dispense with the treadle for operating the lever $G^2$ and connect the lever end of the rod $G^3$ to the rear end of the lever $G^5$, pivoted to the column $A^2$ at $j^2$ and provided at its front end with the laterally-projecting pin $j^3$, with which the lower end of the hub of horn L engages when said horn is depressed, thereby vibrating the levers $G^5$ and $G^2$, causing an adjustment of the stop-lever $c^2$ and a consequent increased backward movement of the pawl-lever $c'$, whereby said pawl-lever is struck by the cam $B^6$ sooner, resulting in an increased forward movement of the pawls $c^3$ and $c^4$ and a consequent greater movement of the ratchet-wheel $c$ and the feed-rolls $b$ and $b'$, said increase being in proportion to the amount of the depression of the horn, caused by the varying thickness of the sole.

The rod $G^3$ is made in two parts, connected together by a telescopic joint and provided with a spring, $k$, the tension of which tends to keep said rod expanded to its greatest length, the upper section of said rod having a portion of its length made rectangular in cross-section and fitted to a bearing in the box $k'$, the inner face of said rectangular portion having secured thereto the steel plate $k^2$, with which the steel cam-surface $k^3$ of the rocker-shaft $k^4$ impinges to clamp said rod and hold it in a fixed position during the time that the feed is taking place, said clamping device being operated by the action of the path $k^5$ in the cylinder-cam $P^3$, firmly secured upon the shaft $O^3$, mounted in bearings P, $P'$, and $P^2$, the two former being secured to the column $A^2$ and the latter to the frame $A^3$ upon the crank-pin $k^6$, formed upon one end of the rocker-shaft $k^4$, all as shown in Figs. 1, 2, 4, and 6.

Figures 4, 6, 7, 8:
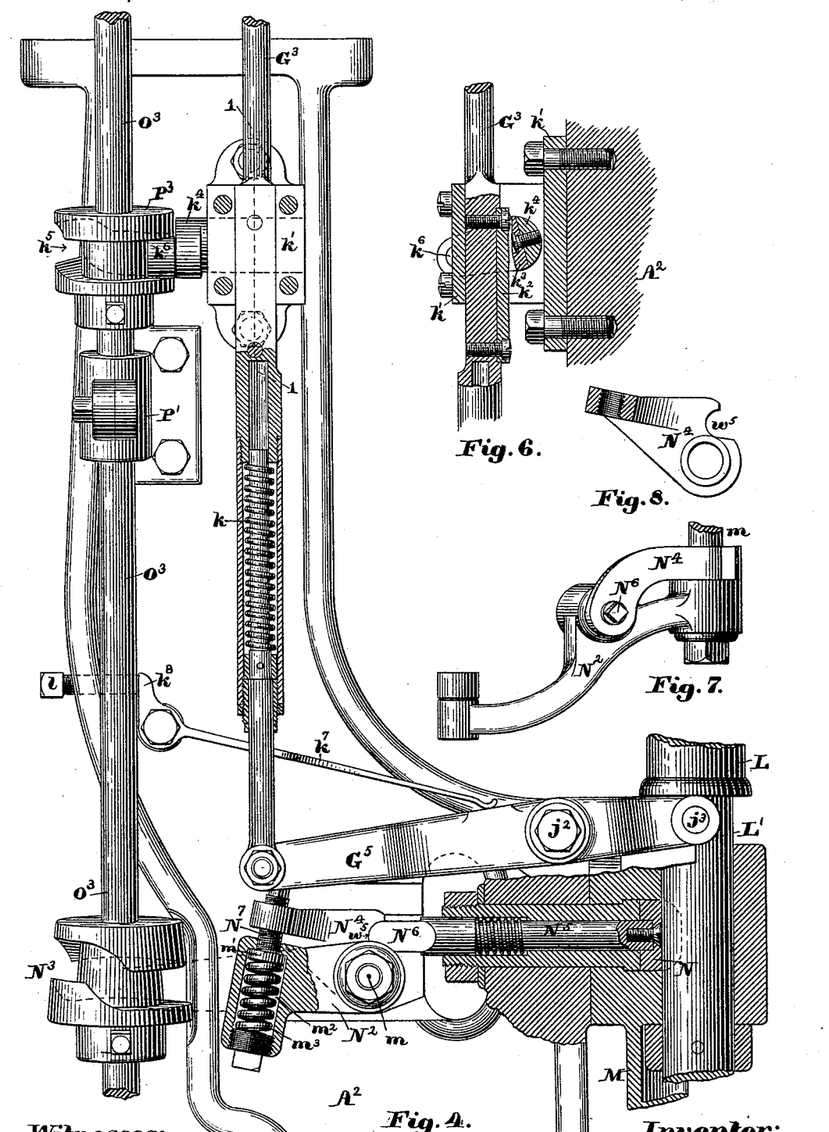
Fig. 4 is a sectional side elevation of the middle portion of the machine, with the work-supporting horn broken away.
Fig. 6 is a partial section on line 1 1 on Fig. 4.
Fig. 7 is a plan of cam-lever and arm for operating the horn-clamping device.
Fig. 8 is a sectional elevation of the clamp-operating arm.

The rear end of the lever $G^5$ is depressed when the horn rises by the reaction of the spring $k^7$, pivoted to the side of the column $A^2$, the tension of which may be regulated by the set screw $l$ acting upon the toe $k^8$, formed upon the rear end of said spring, as shown in Fig. 4.

The object of making the rod $G^3$ in two parts, telescopically connected and provided with the spring $k$, is to enable the operator to depress the horn when the upper section of said rod is clamped, said spring $k$ being of the necessary stiffness required to keep said rod expanded during the ordinary variations of rise and fall of the horn, caused by the variations of thickness in the work being operated upon, said spring, however, readily yielding when the horn is depressed by the action of the treadle $L^4$.

Figure 16:
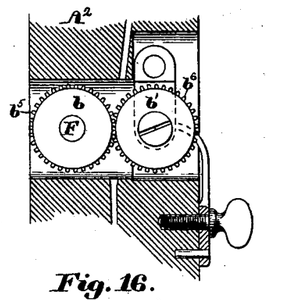
Fig. 16 is an elevation of the wire-feeding rolls, the gears connecting them, and the spring for forcing them together.

The feed-rolls $b$ and $b'$ are compelled to revolve in unison by means of the gear-wheels $b^5$ and $b^6$, as shown in Fig. 16.

The pawl-lever $c'$ has mounted therein a short rocker-shaft, $l'$, which has formed upon or secured to one end thereof the handle or lever $l^2$, by which it may be oscillated about its axis, the opposite end of said shaft projecting beyond said lever $c'$ beneath both of the pawls $c^3$ and $c^4$, which projecting portion is cut away upon one side or made eccentric to its axis, so that by turning said shaft both pawls may be disengaged from the ratchet-wheel $c$, so that the machine can be run without feeding the wire and without removing the wire from the machine, which it is often very desirable to be able to do.

Instead of the pair of toggle-links $v^4$ and $v^5$, the rod $P'$, the cam P, mounted on the shaft O, for operating the horn-clamping bolt, and the lever $v^6$, adjusting-screw $w$, stud $w'$, spring $w^2$, stud $w^3$, and stop-nuts $w^4$, for regulating the pressure of said clamping-bolt, as shown and described in my prior patent before cited, I now use the lever $N^2$, pivoted to the column A² at m, and the cam N³, mounted upon the shaft O³, for vibrating the same, said lever N² having connected therewith, so as to be movable thereby about the same axis of motion, the dog or supplementary lever N⁴, provided near its fulcrum with the semicircular recess w⁵, to receive the rounded rear end of the link N⁶, the front end of which fits a corresponding recess in the rear end of the shoe-carrying clamping-bolt N⁵, and having set in its opposite end the adjusting screw N⁷, provided with a head, m', fitted to the socket m², formed in the lever N², and resting upon the spring m³, inclosed in said socket, all as shown in Figs. 4, 7, and 8.

Figure 26:
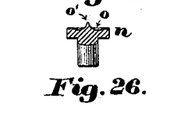
Fig. 26 is a sectional elevation of the anvil.

In the tip of the horn L is set the anvil n, having an annular curved recess, o, in its upper surface surrounding a central teat or point, o', which projects above the level of the outer rim of said anvil, as shown in Fig. 26, and serves to turn the point of the nail and clinch the same, and at the same time by entering the under surface of the material being acted upon insures the proper feeding of the material when the horn is vibrated by the action of the three-sided crank-pin e' upon the slotted arm N', and through it upon the horn-carrying bar or frame M.

Figure 29:
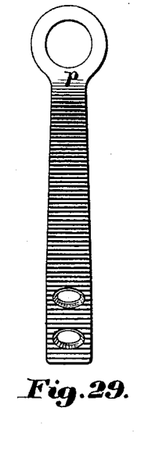
Fig. 29 is a plan of the work-supporting spring secured to the tip of the horn, drawn to an enlarged scale.

To the upper portion of the work-supporting horn is secured the spring p, having formed in its free end an opening of a diameter sufficient to permit the free passage through the same of the head of the anvil, the object of which is to press the boot or shoe upward and hold the sole in contact with the nose I², when the horn is slightly depressed and moved backward preparatory to feeding the boot or shoe the next step, said spring being shown in Figs. 1, 3, and 29.

Figure 10:
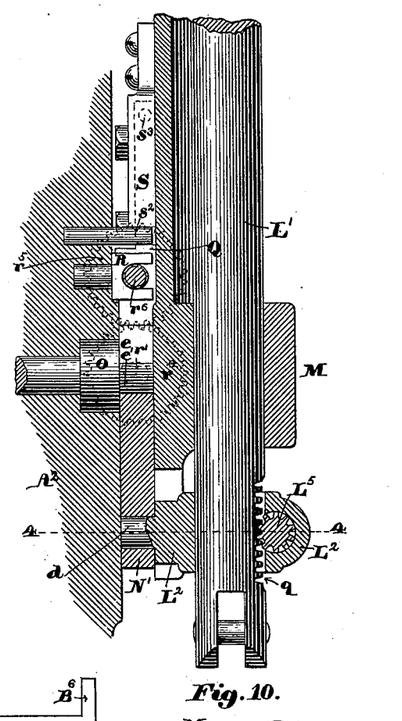
Fig. 10 is a partial vertical section on line 3 3 on Fig. 9.
Figure 11:
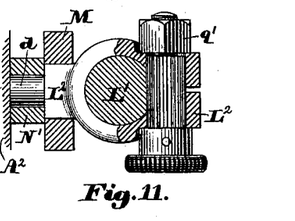
Fig. 11 is a horizontal section on line 4 4 on Fig. 10.
Figure 12:
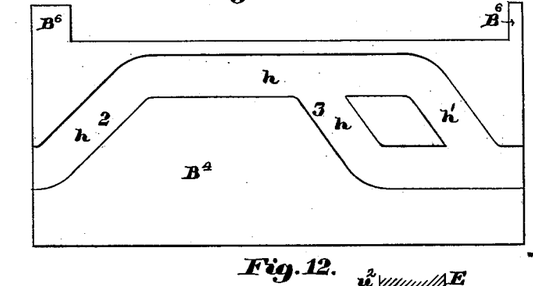
Fig. 12 represents a development of the periphery of the cam for operating the driver and the nail cutting and pointing plungers.

The bolt L⁵, for clamping the bifurcated collar L² to the lower end of the rod L', has formed upon its shank or body a series of pinion-teeth, which engage with the rack-teeth q, formed upon the front side of the rod L', so that by rotating said bolt or pinion said collar may be moved up or down on said rod so as to adjust the arm N' to the desired height, and then be firmly secured to said rod by tightening the nut q', the construction of said parts being clearly shown in Figs. 10 and 11.

In the invention described in my prior patent hereinbefore cited, two set-screws were used for limiting the amount of lost motion between the arm N' and said set-screws before the horn-carrying pivoted frame or bar was acted upon thereby to feed the work being nailed.

In my present invention similar set-screws, r and r', are set in the ears r² and r³ of the bar M, and in addition thereto I mount a small spur gear-wheel, r⁴, upon the screw r', with which meshes a similar gear-wheel, r⁵, mounted upon the screw r⁶, fitted to a threaded bearing in the stand Q, secured to the rear side of the bar M, as shown in dotted lines in Fig. 10.

Figure 9:
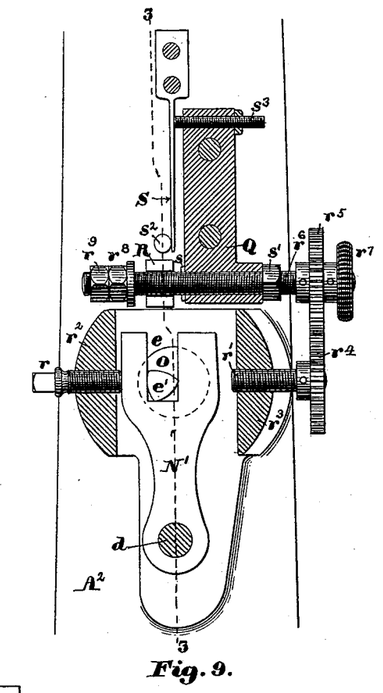
Fig. 9 is a partial sectional elevation, the cutting-plane being on line 2 2 on Fig. 2.

The screw r⁶ has secured thereto at one end the milled head r⁷, by which it may be rotated, and at its opposite end the stop-nut r⁸ and binder-nut r⁹, and has set therein near the middle of its length the pin s, which serves to limit the movement of said screw through the stand Q in one direction by coming in contact with said stand, as shown in Fig. 9, said screw being also provided with the binder-nut s', by which said screw is secured against accidental displacement when it has been properly adjusted.

The stop-nut r⁸ serves to limit the movement of the horn-carrying pivoted bar M about its pivot, caused by the action of the crank-pin e' upon the arm N' and of said arm upon the set-screw r', by coming in contact with the forked stud R, set in the column A², as shown in Figs. 9 and 10.

The screw r' is threaded fourteen to the inch, and is a right-handed screw, and the screw r⁶ has a left-handed thread sixteen to the inch, so that when said screws are rotated they will each be advanced or retracted a distance proportionate to their respective distances from the axis about which the bar M vibrates.

A spring, S, is secured to the rear side of the bar M, the free end of which bears against the pin s², set in the column A², and tends to move the lower end of the bar M toward the right of Fig. 9, the tension of said spring being regulated by the set-screw s³, as shown in full lines in Fig. 9 and in dotted lines in Fig. 10.

Figure 13:
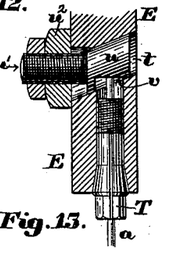
Fig. 13 is a vertical section through the lower portion of the driver-stock, and showing in elevation the means for adjusting the driver.
Figures 14, 15:
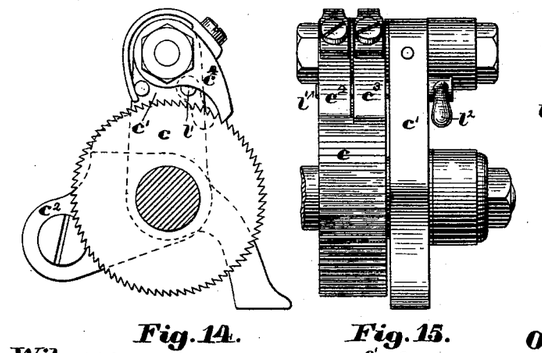
Figs. 14 and 15 are respectively a side elevation and an edge view of the ratchet and pawls for operating the wire-feeding pressure-rolls.

The driver stock E has an oblique hole, t, drilled through it from front to rear, in which is fitted the cylinder u, having its ends oblique to the axis thereof, and provided with the threaded shank u', also oblique to the axis of said cylinder, by which and the nut u² said cylinder may be moved obliquely toward the front or rear of said driver-stock E, said cylinder having a notch cut in its under side, so as to form a flat horizontal surface, v, to rest upon the upper end of the steel-wire-like driver a, and serve as an adjustable gage to aid in setting said driver preparatory to securing it in the split socket T, all as shown in Fig. 13.

The nose I² has inserted therein a hardened-steel bushing divided longitudinally into two equal parts, so that in case a nail or chips get jammed therein, so that the driver will not remove them, the nose may be removed, when the bushing may be backed out and then separated and removed laterally from the obstruction.

What I claim as new, and desire to secure by Letters Patent of the United States, is—

1. In a machine for cutting nails from wire and driving the same, the combination of a reciprocating driver, a pair of toggle-links, a reciprocating slide for operating said links and provided with a cam stud or truck, a reciprocating nail-cutting-die plunger, a lever for moving said cutting-die and provided with a cam stud or truck, a cam provided with a regular path for operating said die-operating lever, and a switch-path or cut-off to act upon and cause the forward movement of the toggle-operating slide in advance of the throw of the regular path, and a spring constructed and arranged to be struck by said slide in its rearward movement and by its reaction compel its truck or stud to enter said switch-path or cut-off, as set forth.

2. In combination with the reciprocating nail-cutting male die, the fixed female cutting-dies, and the vertically-reciprocating driver, a chip-guard plunger constructed and arranged to be moved in one direction by the forward movement of said male cutting-die, a lever fulcrumed at one end and connected at its other end to said chip-guard plunger, a spring for moving said lever and plunger in the opposite direction, and a stop-plate constructed and arranged to prevent said backward movement until the driver has been moved above said guard-plunger.

3. In a machine for cutting nails from wire and driving the same, the combination of a pair of dies having provision for forming the head shoulders of a nail and severing the same from the wire during the forward movement of the male die, a fixed male die located above said severing and shaping dies, and a female die constructed and arranged to co-operate with said fixed male die during its rearward movement to point the end of the wire from which a nail has just been severed preparatory to the cutting of a new nail therefrom at the next operation of the nail severing and shaping dies.

4. The combination of the fixed male pointing-die, a female pointing-die made in two parts, a die-holder plate carrying said female die, a rocker-shaft provided with a lip or lug to engage said die-carrying plate, a cam for operating said rocker-shaft, and a system of levers connecting said cam and rocker-shaft.

5. In a machine for cutting nails from wire and driving the same, the combination of a pair of dies having provision for forming the head shoulders of a nail and severing the same nail from the wire, a pair of dies having provision for pointing the end of the wire from which the nail has been severed, levers constructed and arranged to impart motion to said dies, and a cam constructed and arranged to operate both sets of dies.

6. In a machine for cutting nails from a wire and driving the same, and as a means of regulating the length of wire to be fed, the combination of a pair of feed-rolls constructed and arranged to grip the wire to be fed, a ratchet-wheel secured upon a feed-shaft, a two-armed lever mounted upon and movable about said shaft and carrying at one end a pawl to engage with said ratchet-wheel, an arm provided with a laterally-projecting stop-lug and also mounted upon and movable about said shaft, a vertically-movable bar pivoted to the free end of the stop-arm, a spring to move said bar upward, an adjustable cam-stop constructed and arranged to limit and vary the upward movement of said bar, a two-armed lever pivoted to said bar with one end in contact with the toe of the pawl-lever, a cam constructed to act alternately upon the pawl-lever to feed the wire, and upon the last-mentioned two-armed lever to move said pawl-lever backward, a lever connected at one end to said vertically-movable bar, a rod connected by one end to the opposite end of said last-mentioned lever, another two-armed lever pivoted at one end to the lower end of said rod, and the work-supporting horn constructed and arranged to act upon the other end of said last-mentioned lever, all constructed, arranged, and operating as set forth, whereby the length of wire to be fed will be varied by the varying thickness of material which passes between the tip of the horn and nose of the machine.

7. In combination with the feed-wheels, the ratchet and pawls, the levers for operating the same, the adjustable stop-arms, the levers and bar for operating the same, and the horn constructed and arranged to operate said levers, a vertically-movable rod connecting two of said levers and having a section thereof made rectangular in cross-section and fitted to a guiding-bearing, a rocker-shaft having a cam-surface arranged to impinge upon and grip said rod, a lever mounted upon said rocker-shaft, and a cam for imparting to said rocker-shaft an intermittent oscillating motion, substantially as and for the purpose described.

8. In combination with a feed mechanism provided with an adjustable stop-arm to vary the length of wire to be fed, the lever $G^2$, the rod $G^3$, made in two parts telescopically connected and provided with a spring to expand said rod to its greatest length, the bearing $k'$, the rocker-shaft $k^4$, provided with the cam-surface $k^3$, the crank-pin $k^6$, the cam $P^3$, the lever $G^5$, and the horn L, all constructed, arranged, and adapted to operate substantially as described.

9. In combination with the vertically-movable horn, the clamping-bolt $N^5$, the lever $N^2$, the cam $N^3$ to act upon and vibrate said lever, the dog or supplementary lever $N^4$, provided with the semicircular recess $w^5$, the link $N^6$, connecting said dog and the bolt $N^5$, the adjusting-screw $N^7$, and the spring $m^3$, substantially as described.

10. The anvil $n$, provided with the annular curved recess $o$, and the central teat or point, $o'$, projecting above the level of the outer rim of said anvil, which teat serves to feed the shoe beneath the nose of the machine and when the nail is driven to clinch it upon the inside of the sole.

11. In combination with a vertically-movable and laterally-vibrating work-supporting horn, an anvil set in the tip of said horn and provided with an annular curved recess, and a central teat or point projecting above the level of the outer rim thereof, substantially as described.

12. The combination of a work-supporting horn and a spring secured to the upper side of the tip of said horn, with its free end perforated for the passage of the anvil and adapted to hold the work against the nose of the machine when the horn is depressed and being moved backward preparatory to feeding the work another step.

13. In combination with the feed roll, the ratchet-wheel, pawls, and pawl-lever for operating said feed-rolls, the rocker-shaft $l'$, having a cut-away or eccentric portion, and the handle $l^2$, all so arranged that the pawls may be raised and held out of engagement with the teeth of the ratchet, substantially as described.

14. The combination of the horn L, the rod L', provided with the rack-teeth $q$, the bifurcated collar $L^2$, provided with the shank or journal $d$, the combined clamping-bolt and pinion $L^3$, the binding-nut $q'$, the slotted arm N', and the crank-pin $e'$, all constructed, arranged, and adapted to operate substantially as and for the purpose described.

15. In combination with the pivoted horn-carrying bar M, the horn-supporting rod L', the collar $L^2$, the arm N', the shaft O, provided with the crank-pin $e'$, means having provision for rotating said shaft, the set-screws $r$ and $r'$, and the adjusting-screw $r^6$, the screws $r'$ and $r^6$ being differentially threaded, the gear-wheels $r^4$ and $r^5$, the milled head $r^7$, the stand Q, secured to the bar M and threaded to receive the screw $r^6$, the binding-nut $s'$, the stop-nut $r^8$, the forked stud R, set in the column $A^3$, all constructed, arranged, and adapted to operate substantially as and for the purposes described.

16. The combination of the pivoted bar M, the rod L', the collar $L^2$, the arm N', the screws $r, r'$, and $r^6$, the gears $r^4$ and $r^5$, the stand Q, set-screw $s^3$, the spring S, and the nuts $s'$ and $r^3$, all carried by said bar M, and the forked stud R, the pin $s^2$, both set in the column $A^3$, the shaft O, provided with the crank-pin $e'$, and means having provision for rotating said shaft O, substantially as described.

17. In combination with the driver-stock and a steel-wire-like driver, a bifurcated socket having a conical or tapered outer surface and adapted to be screwed into the lower end of the driver-stock to clamp the driver, and an obliquely-movable wedge having a flat horizontal surface upon its under side to rest upon the upper end of the driver, substantially as described.

18. The driver-stock E, provided with a socket to receive the driver-clamping device, and having an oblique cylindrical hole through the same from front to rear, in combination with the notched bolt $u$, provided with the threaded shank $u'$, oblique to the axis of the cylinder, and the clamping-nut $u^2$, all constructed and arranged to act upon the upper end of the driver to adjust it to the desired position.

19. In combination with the nose $I^2$, a hardened-steel bushing made in two parts divided longitudinally and fitted in a fixed position in a socket formed in said nose, substantially as and for the purposes described.

In testimony whereof I have signed my name to this specification, in the presence of two subscribing witnesses, on this 7th day of November, A. D. 1887.

ORRIL R. CHAPLIN.

Witnesses:
WALTER E. LOMBARD,
JAMES T. MURRAY.